Dec. 26, 1944.  L. J. HARRISS ET AL  2,365,699
APPARATUS FOR MAKING PIES
Filed May 16, 1941  2 Sheets-Sheet 1

INVENTORS
Lloyd J. Harriss
Bernard Lambers
BY
Spencer, Hayell, Huston & Cash
attys.

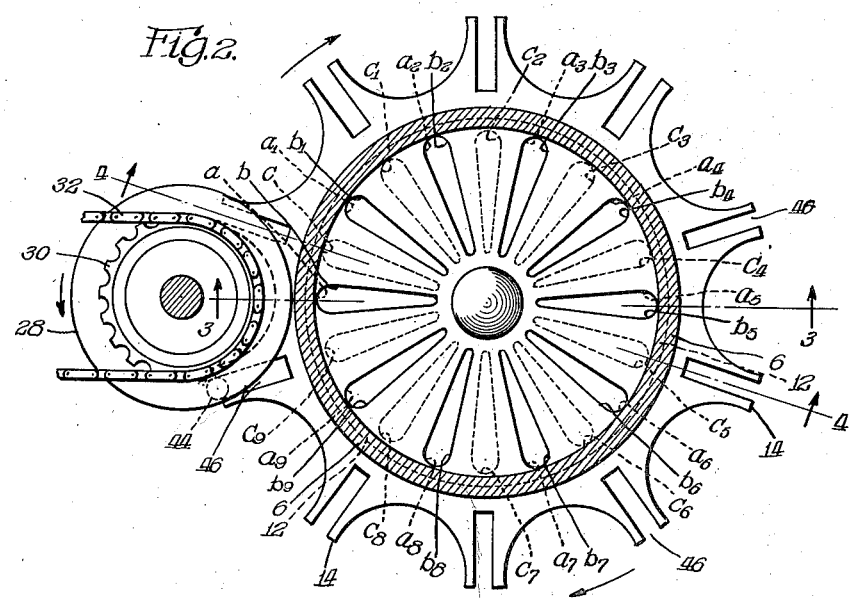
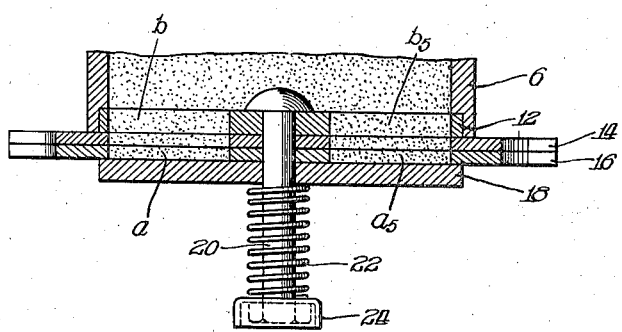
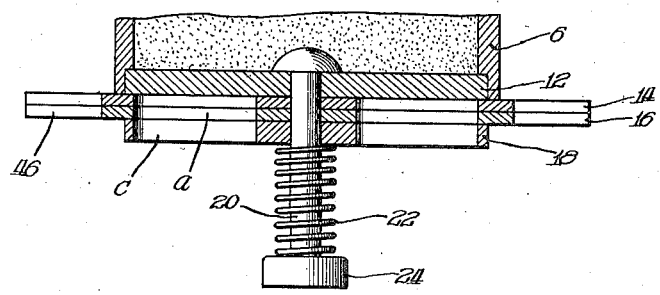

Patented Dec. 26, 1944

2,365,699

UNITED STATES PATENT OFFICE 2,365,699

APPARATUS FOR MAKING PIES

Lloyd J. Harriss, Kenilworth, and Bernard Lambers, Oak Park, Ill.; said Lambers assignor to said Harriss Application May 16, 1941, Serial No. 393,736

8 Claims. (Cl. 107—1)

This invention relates to apparatus for supplying powdered ingredients to pastry products during the preparation thereof, and more particularly to apparatus employed in conjunction with a conveyor system for preparing pies prior to baking.

One of the objects of the present invention is to provide a new and improved device for supplying powdered sugar, cinnamon, spices or other powdered materials to pastry products such as pies during the preparation thereof.

Another object of the invention is to provide a new and improved means for quantitatively measuring and determining the amount of a powdered material to be applied to a pie, together with apparatus for applying the exact amount at the proper rate and at the proper time.

Another object of the invention is to provide a device of the character described in which varying amounts of the powdered material may be applied in accordance with varying conditions of use.

Still another object of the invention is to provide apparatus for synchronizing the addition of a powdered ingredient to a pastry product with the movement of said pastry product on a conveyor system.

Other objects and advantages of the invention will be apparent by reference to the following description in conjunction with the accompanying drawings, in which:

Figure 2 represents an enlarged plan sectional view taken through the line 2—2 of Figure 1;

Figure 3 is a vertical cross-sectional view with parts broken away taken along the line 3—3 of Figure 2;

Figure 4 is another vertical cross-sectional view with parts broken away taken along the line 4—4 of Figure 2.

Figure 1:
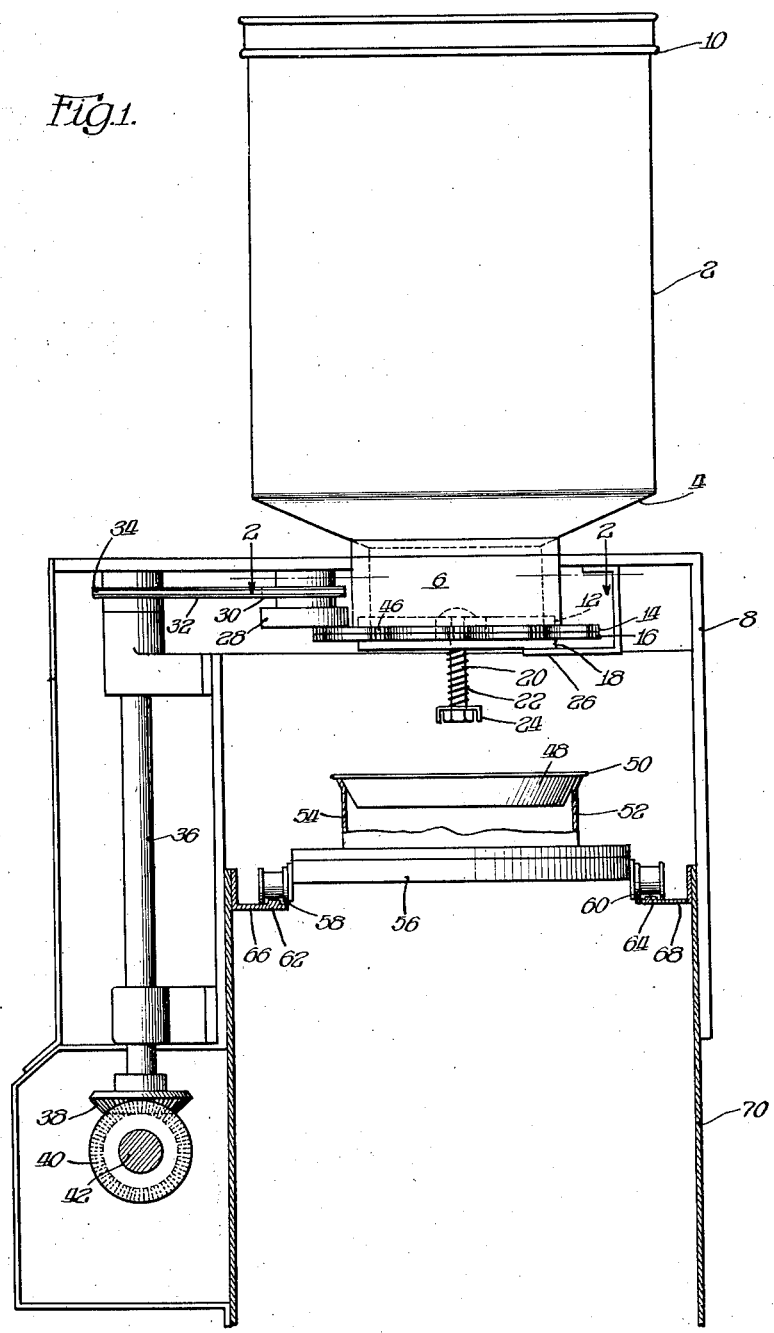
Figure 1 represents an elevational view partly in section of one form of apparatus for practicing the invention.

The apparatus illustrated in Figure 1 comprises a container or vessel 2 containing sugar, cinnamon, mixtures of sugar and cinnamon or other powdered ingredients which are to be supplied to the pastry product. The container 2 converges at the lower end 4 to a hopper or feeding area 6 which is supported by the frame 8. The container 2 may be integral with or removable from the converging area 4 or the hopper 6, or both. A lid 10 is provided to enclose the contents of the container 2.

The principal elements of the device comprise an upper plate or disk 12, a plurality of intermediate plates or disks 14 and 16 and a bottom plate or disk 18, all of which are held in assembled relationship by means of a bolt member 20 provided with a sorrounding spring 22 and having at the lower end thereof a nut 24.

The upper plate or disk 12 is rigidly fixed to the hopper 6 in any suitable manner, while the bottom plate 18 and the intermediate disks or plates 14 and 16 are readily removable by removing the nut 24 and the spring 22. During operation of the device the tension on spring 22 is such as to hold the bottom plate 18 and the intermediate disks 14 and 16 in close association with each other and with the upper plate 12. In order to insure that the bottom disk 18 occupies a permanent or fixed position during the operation of the device, it is attached to a portion of the frame at point 26, as shown in Figure 1, by means of a bolt or any other suitable means.

As shown in Figure 2, each of the disks or plates 12, 14, 16 and 18 is provided with a plurality of elongated openings or apertures. The apertures in the upper plate 12 are shown in full lines and are designated by the letters B, $B_1$, $B_2$, $B_3$, $B_4$, $B_5$, $B_6$, $B_8$ and $B_9$. The apertures in the two intermediate disks 14 and 16 are aligned with each other and are designated by the letters A, $A_1$, $A_2$, $A_3$, $A_4$, $A_5$, $A_6$, $A_7$, $A_8$ and $A_9$. The apertures in the bottom plate 18 are shown in dotted lines in Figure 2 and are designated by the letters C, $C_1$, $C_2$, $C_3$, $C_4$, $C_5$, $C_6$, $C_7$, $C_8$ and $C_9$. In the position of the mechanism shown in Figure 2, the apertures A through $A_9$ and B through $B_9$ are aligned as shown in Figure 3. In this position the powdered material in the vessel 2 is free to pass from the hopper 6 through the apertures B through $B_9$ into the apertures A through $A_9$. This may be termed the "loading position," because in this position the powdered material is allowed to run by gravity into the compartments defined by the apertures A through $A_9$. These compartments are in effect measuring chambers and the amount of the powdered material which is to be dispensed into the pastry product on a subsequent movement of the device is measured by the volume or cubical contents of the compartments A through $A_9$. The amount of the material may be lessened or increased by using disks 14 and 16 of different thicknesses. This is readily accomplished merely by unscrewing the nut 24, removing the spring 22, uncoupling the bolt at point 26 and dropping down the bottom plate 18 and the intermediate disks 14 and 16. It will be understood, of course, that a single disk may be used instead of the disks 14 and 16.

As previously indicated, the upper plate 12 and the bottom plate 18 are fixed, while the intermediate disks 14 and 16 are free to move. The movement of the intermediate disks 14 and 16 is accomplished by the rotation of the element 28 through a sprocket gear 30, driven by a chain 32 from another sprocket gear 34 fixed to one end of a shaft 36. The other end of the shaft 36 is fixed to a miter gear 38 engaging with another miter gear 40 fixed on a shaft 42 driven from a motor, or any other suitable driving means. The actuating element for moving the intermediate disks 14 and 16 is a pin, or similar projecting member 44, fixed to the rotary element 28 near the edge thereof and adapted to enter the passageways, grooves, or tracks 46 which are formed in the outer portions of the intermediate elements 14 and 16.

As shown in Figure 2, the rotary element 28 rotates counterclockwise and by the successive engagement of the pin 44 in the cam tracks 46, intermittent motion is imparted to the intermediate disks 14 and 16. This motion is such that the openings A through $A_9$ and B through $B_9$ are aligned with the disks 14 and 16, are at rest in the loading position shown in Figure 3, and move out of alignment as soon as the cam element 44 begins to move in the cam track 46 in the position shown in Figure 2. As soon as the apertures A through $A_9$ move out of alignment with the apertures B through $B_9$, the closed or unapertured portion of the disk 12 prevents any further sugar, cinnamon or other powdered material from entering the compartments A through $A_9$. As the pin 44 continues to move down track 46 and thereby rotate the intermediate disks 14 and 16 in a clockwise direction, the apertures A through $A_9$ pass over the apertures C through $C_9$, and simultaneously the powdered material contained in the apertures A through $A_9$ is discharged through the apertures C through $C_9$ in an even and uniform manner. The position of these apertures with respect to each other at the point of maximum discharge is shown by Figure 4. It will be understood, of course, that this position is constantly changing and that in a short space of time the apertures A through $A_9$ pass out of alignment with the apertures C through $C_9$, but the time interval is such that by this time the contents of the compartments A through $A_9$ have been discharged and spread gradually and evenly over the surface of the pastry beneath. The point of maximum discharge occurs when the pin 44 has reached the innermost limit of its movement in the track 46. From this point on, the pin 44 begins to move out of the track 46 and when it finally moves out completely, the intermediate disks 14 and 16 come to rest and remain at rest until the pin 44 engages a successive track 46. The aperture A has now moved over to the position formerly occupied by the aperture $A_1$, and is now in loading position beneath the aperture $B_1$. While the mechanism is temporarily at rest another quantity of the powdered material is measured in the aperture $A_1$, and in this way the distribution of the powdered material is intermittently effected over any desired length of time.

As shown in Figure 1, the pie pan 48, carrying a pie crust 50, which has previously been filled with any desired ingredient, or which may be unfilled, is supported by a pair of upright elements 52 and 54, which in turn are supported by a transverse element 56 fixed to a pair of link chains 58 and 60. The link chains 58 and 60 ride on tracks 62 and 64 supported by L-shaped members 66 and 68, which in turn are supported by the frame 70 of the conveyor mechanism. The drive shaft 42 is driven by the same mechanism which drives the conveyor. The conveyor is connected with the drive mechanism through any suitable form of intermittent motion mechanism, not shown, whereby the pie pan 48 advances in a step by step movement in synchronism with the actuation of the measuring and dispensing device. The step by step advance of the pie pan is made while the powder dispensing mechanism is in the loading position and at a point in which the cam element 44 is out of engagement with the cam track 46. Thus, there is a measurement of the powdered ingredient, but no dispensing thereof during the advancement of the pie pan to the fixed station beneath the powder dispensing mechanism, shown in Figure 1.

It will be understood that variations and modifications may be made in the method and apparatus described without departing from the invention.

Having thus described the invention, what we claim as new and desire to secure by Letters Patent of the United States is:

1. A device for applying a predetermined amount of a powdered ingredient to a pastry, said device comprising a plurality of apertured elements each containing a plurality of apertures including two outer elements and at least one intermediate element between said outer elements, the apertures in said intermediate element being capable of alignment alternately with the apertures of said outer elements, means for supplying a powdered ingredient to one of the outer elements, and means for moving at least one of said elements relatively to the other always in the same direction and in a predetermined manner to cause the apertures of one outer element and of the intermediate element to stop in alignment and the apertures of the other outer element and of the intermediate element to move past each other without stopping and with the apertures of not more than one of the outer elements in alignment with the apertures of the intermediate element at the same time.

2. A device for applying a predetermined amount of a powdered ingredient to a pastry, said device comprising a plurality of apertured elements each containing a plurality of apertures including two outer elements and an intermediate element between said outer elements, the apertures in said intermediate element being capable of alignment alternately with the apertures of said outer elements, means for supplying a powdered ingredient to one of the outer elements, and means for moving said intermediate element relatively to said outer elements always in the same direction in a predetermined manner to cause the apertures in said intermediate element to be successively aligned and stationary opposite the apertures of the outer element to which the powdered ingredient is supplied and then without stopping to move past and in alignment with the apertures of the other outer element through which the powdered ingredient is discharged to the pastry.

3. A device for applying a predetermined amount of a powdered ingredient to a pastry, said device comprising a plurality of apertured elements each containing a plurality of apertures including two outer elements and an intermediate element between said outer elements, the apertures in said intermediate element being capable of movement in a closed path for alignment alternately with the apertures of said outer elements, means for maintaining a supply of a powdered ingredient in continuous contact with one of the outer elements and in an amount in excess of the amount required to fill the apertures thereof, means for maintaining said outer elements in a relatively fixed position, and an intermittent motion mechanism operatively associated with said intermediate element to successively move the apertures of said intermediate element into and out of alignment first with the apertures of said outer element in contact with the supply of the powdered ingredient and then successively into alignment with the apertures of the other outer element, and stopping the movement of said intermediate element with the apertures thereof in alignment with the apertures of only one of said outer elements.

4. A device for applying a predetermined amount of a powdered ingredient to a pastry, said device comprising a plurality of apertured elements each containing a plurality of apertures including two outer elements and an intermediate element between said outer elements, the apertures in said intermediate element being capable of alignment alternately with the apertures of said outer elements, means for maintaining a supply of a powdered ingredient in continuous contact with one of the outer elements and in an amount in excess of the amount required to fill the apertures thereof, means for maintaining said outer elements in a relatively fixed position, and an intermittent motion mechanism operatively associated with said intermediate element to successively move the apertures of said intermediate element into and out of alignment first with the apertures of said outer element in contact with the supply of the powdered ingredient and then successively into alignment with the apertures of the other outer element, said intermittent motion mechanism being operative to stop said intermediate element with its apertures opposite the apertures of the outer element through which the powdered ingredient is supplied and to move the filled apertures of said intermediate element past the apertures of said other outer element without stopping.

5. A device for applying a predetermined amount of a powdered ingredient to a pastry, said device comprising a plurality of plate-like members including an upper member, a lower member and an intermediate member, said plate-like members each having apertures therein extending radially from a central axis and being capable of alignment, means for supplying a powdered ingredient to the apertures of the upper plate member, means for rotating the intermediate plate member in a predetermined manner whereby the apertures therein are successively aligned with the apertures of the upper plate member and then with the apertures of the lower plate member, but not with both at the same time, and means for stopping the rotation of said intermediate plate when the apertures thereof are in alignment with the apertures of the upper plate and for rotating the apertures of the intermediate plate past the apertures of the lower plate without stopping.

6. A device for applying a predetermined amount of a powdered ingredient to a pastry, said device comprising a plurality of plate-like members including an upper member, an intermediate member and a lower member, the upper member and the lower member being fixed with respect to each other and the intermediate member being rotatable with respect to both of said other members, each of said members having apertures therein extending radially from a central axis about which the intermediate member rotates and capable of alignment with each other, means for holding an excess supply of the powdered ingredient in contact with the apertures of the upper member, and an intermittent motion mechanism operatively associated with the intermediate member and operative to cause said intermediate member to come to a rest with the apertures thereof aligned with the apertures of said upper member and to rotate a predetermined distance until the apertures of said intermediate member have passed over the apertures of said lower member whereby the apertures of said intermediate member are filled with a quantity of the powdered ingredient when opposite the apertures of said upper member, and the resultant measured quantity of the powdered ingredient is discharged through the apertures of the lower member while the intermediate member is moving with respect to the lower member.

7. A device for applying a predetermined amount of a powdered ingredient to a pastry, said device comprising a plurality of plate-like members including an upper member, a lower member and an intermediate member, radially extending apertures in each of said members extending around the face thereof, the apertures in the upper member and the apertures in the lower member being capable of alignment alternately with the apertures in the intermediate member, means for maintaining an excess supply of a powdered ingredient in contact with the apertures of the upper member, means for maintaining the upper and lower members relatively fixed with respect to each other, means for rotating the intermediate member about an axis through said members, said means comprising a plurality of spaced cam tracks in said intermediate member extending radially inwardly from the periphery at spaced intervals, and a continuously rotating element having a cam element thereon operative to rotate while reciprocating successively in said cam tracks whereby said intermediate element is rotated intermittently so that its apertures are in alignment first with the apertures of said upper member and then with the apertures of said lower member, but not with both at the same time.

8. In combination with a conveyor system for preparing pies including a conveyor mechanism for conveying prepared pie doughs carried by pie pans in a step by step movement to and from a fixed station, a device for applying a predetermined amount of a powdered ingredient to the pies, said device comprising a plurality of plate-like members including an upper member, a lower member and an intermediate member, said plate-like members being adjacent each other each having apertures therein extending around the face thereof radially from a central axis and being capable of alignment, means for supplying a powdered ingredient to the apertures of the upper plate member, and means synchronized with the movement of said conveyor system for rotating the intermediate plate member in a predetermined manner whereby the apertures therein are successively aligned with the apertures of the upper plate member and then with the apertures of the lower plate member, but not with both at the same time.

LLOYD J. HARRISS.
BERNARD LAMBERS.